United States Patent [19]

Aoki

[11] Patent Number: 4,717,524
[45] Date of Patent: Jan. 5, 1988

[54] METHOD FOR MOLDING A THIN-WALL CONTAINER USING SYNTHETIC RESIN

[76] Inventor: Katashi Aoki, 6037, Ohazaminamijo, Sakakimachi, Hanishina-gun, Nagano-ken, Japan

[21] Appl. No.: 704,290

[22] Filed: Feb. 22, 1985

[30] Foreign Application Priority Data

Feb. 24, 1984 [JP] Japan ................................. 59-33772

[51] Int. Cl.⁴ .................... B29C 49/42; B29C 49/56; B29C 49/02
[52] U.S. Cl. ................................... 264/550; 264/553; 264/544; 425/324.1; 425/387.1; 425/388; 425/533
[58] Field of Search ............... 264/513, 532, 537, 538, 264/544, 547, 549–551, 553; 425/533, 324.1, 387.1, 388

[56] References Cited

U.S. PATENT DOCUMENTS

| | | | |
|---|---|---|---|
| 2,983,955 | 5/1961 | Gajdosik | 425/324.1 X |
| 3,324,509 | 6/1967 | Hey et al. | 264/537 X |
| 3,471,896 | 10/1969 | Ninneman | 264/532 X |
| 3,488,805 | 1/1970 | Biglin et al. | 425/533 X |
| 3,944,643 | 3/1976 | Sato et al. | 264/532 |

FOREIGN PATENT DOCUMENTS

| | | | |
|---|---|---|---|
| 1495851 | 8/1967 | France | 425/388 |
| 60-244518 | 12/1985 | Japan . | |

*Primary Examiner*—Jan H. Silbaugh
*Assistant Examiner*—Hubert C. Lorin
*Attorney, Agent, or Firm*—Ostrolenk, Faber, Gerb & Soffen

[57] ABSTRACT

This invention provides a new molding method in which in molding a preform injection molded into a holding mold into a container having a wide opening by blow or vacuum molding, the preform may be held and locked by a holding mold and a core member or a container molding mold, and products may be easily removed merely by opening the holding mold in a horizontal direction.

1 Claim, 8 Drawing Figures

METHOD FOR MOLDING A THIN-WALL CONTAINER USING SYNTHETIC RESIN

BACKGROUND OF THE INVENTION (1) Field of the Invention

This invention relates to a method which comprises moving a plate-like or flat preform obtained by injection molding a synthetic resin into a mold to a blow mold, as it is, and applying stretching by a rod and expansion by air pressure to the preform into a container which is wide in opening and has a thin-wall.

(2) Description of the Prior Art

It is already known that a flat preform subjected to injection or injection compression molding is molded into a cup-like or box-like thin-wall container by making use of blow molding or vacuum molding.

This molding method requires to effect blowing or vacuum molding while holding a peripheral edge of a flat preform, and said holding force need be extended over the whole peripheral edge. If there is a part which partly lacks in holding force, said part is slipped out of a holding mold by the blowing force or attracting force to fail to mold a well-shaped thin-wall container.

In view of the foregoing, in the conventional method, upwardly directed projections are provided within a lateral groove formed in the peripheral wall of a cavity of a mold for molding a preform, and the projections are forced into the peripheral edge of the preform when the latter is molded to serve as a stop during molding a container.

With such a stop, a molded container cannot be removed from a preform molding mold as it is, and therefore, the preform molding mold is made to comprise two upper and lower members placed one above the other so as to be moved to and from each other, and said lateral groove is formed between the upper member and the lower member. In removing a container, the lower member is moved downwardly to open the lateral groove so that the peripheral edge of the preform is moved away from the projection and then removed.

Therefore, the lateral groove need be operated to open and close vertically every time a container is molded, and opening is carried out with the lower member moved downwardly where the container molding mold is positioned. Therefore, the positional relation with respect to the container molding mold also need be taken into consideration, which poses a drawback in that construction of the preform molding mold also becomes complicated.

In addition, since the projection is forced into the peripheral edge when the preform is molded, there poses a further disadvantage that the height of the lateral groove has a limitation, the peripheral edge increases its thickness more than as needed, a mark formed by the projection forced-in remains as an annular groove, and as a result the peripheral edge tends to be bended.

SUMMARY OF THE INVENTION

This invention has been achieved in order to solve the disadvantages noted above with respect to prior methods, and it is an object of the invention to provide a new molding method in which a preform which is initially injection molded into a holding mold can then be held between the holding mold and a core member or a container molding mold and locked when it is molded into a container having a wide opening by blowing or vacuum molding, and a product can be easily removed merely by opening the holding mold in a horizontal direction.

It is a further object of the present invention to provide a new molding method in which operation from injection molding of a plate-like or flat preform to blowing or vacuum molding of a container which is wide in opening and has a thin-wall, for example such as a cup or box-like container may be continuously carried out, and products which are thick in peripheral edge and thin in other portions, even in distribution of wall thickness and excellent in dimensional accuracy may be molded at high speeds.

It is another object of the present invention to provide a new molding method in which a container or the like which is wide in opening and has a thin-wall and whose inner layer and outer layer are formed of different synthetic resin may be molded in such that a preform is merely subjected to double layer molding and others are molded similar to the case of single layer.

This invention intended to achieve the aformentioned objects comprises using a horizontally divisible holding mold interposed between an upper mold and a lower mold which are disposed at an injection molding position and provided with a lateral groove for molding an outer edge of a preform in a peripheral wall of a cavity having the same plane shape as that of a cup-like or box-like container or the like, injection molding a flat preform whose outer edge is fitted into the holding mold, releasing the preform from the upper mold and lower mold while retaining moldable heat to transfer it together with the holding mold to a container molding position, immediately closing a core member above the holding mold and a container molding mold therebelow, holding the circumference of the preform by the holding mold and the core member or the container molding mold, and thereafter molding a container which is wide in opening and has a thin wall by blowing or vacuum molding of the preform.

A mold used in this invention comprises a horizontally divisible holding mold having a cavity having the same plane shape as a that of a cup-like or box-like container, said cavity being formed at its peripheral wall with a lateral groove for molding an outer edge of a preform, an upper mold and a lower mold for closing the holding mold held therebetewen and at an injection molding position for molding a plate-like or flat preform, a core member at a blow molding position to close the upper portion of the holding mold having the preform within the cavity, and a container molding mold closed with respect to the lower portion of the holding mold, the circumference of the preform being held by the holding mold within the cavity.

The method in accordance with the present invention may be easily carried out by use of an injection stretching blow molding machine (Japanese Patent Application No. 59-100164) (Provisional Pub. No. 60-244518 of Dec. 4, 1985) developed by the present inventor. Where a container has two layers, an injection operation section disclosed in the aforesaid injection stretching blow molding machine can be merely changed in mode from single layer molding to double layer molding for easy execution of operation. Furthermore, for molding material, all the possible synthetic resins for stretching blow molding or vacuum molding may be used.

In the present invention, a plate-like or flat preform transferred from the injection molding position to the container molding position together with the holding mold is held by the holding mold and the core member or container molding mold, and thereafter the preform is subjected to blowing or vacuum molding into a thin wall container. Therefore, locking of the preform at the time of molding the container is posiitve and the preform is not slipped out of the holding mold by the blowing force or attracting force. Furthermore, the lateral groove for molding the outer edge provided in the peripheral wall of the cavity of the holding mold need not be opened or closed, and therefore, the construction of the holding mold is simple and the opening and closing operation thereof are not required. Thus, the steps from the injection molding of the preform to the molding and removal of the molded products may be simplified for high speed operation. Moreover, there are many merits in that the wall-thickness distribution of the molded container is good, the dimensional accuracy is also excellent, and in case of stretching blow molding, the strength increases.

BRIEF DESCRIPTION OF THE DRAWINGS

The drawings illustrate the molding method for thin-wall containers and the mold apparatus in accordance with this invention.

DETAILED DESCRIPTION OF THE INVENTION

Figure 1:
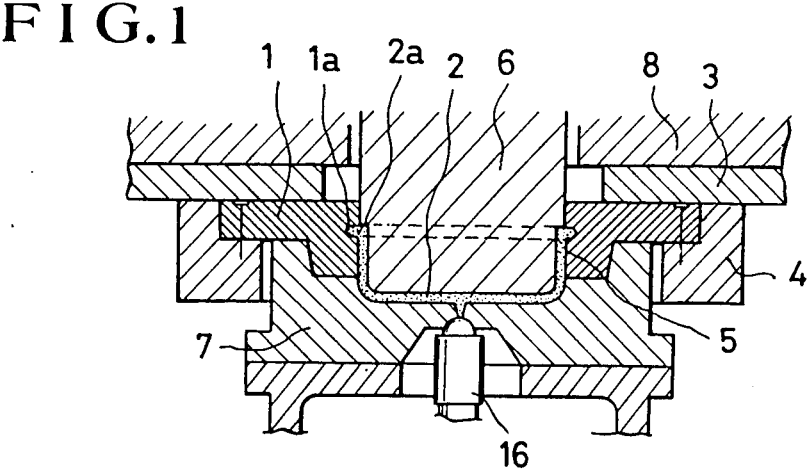
FIG. 1 is a longitudinal sectional view of an injection mold device when a flat preform is injection molded.
Figure 2:
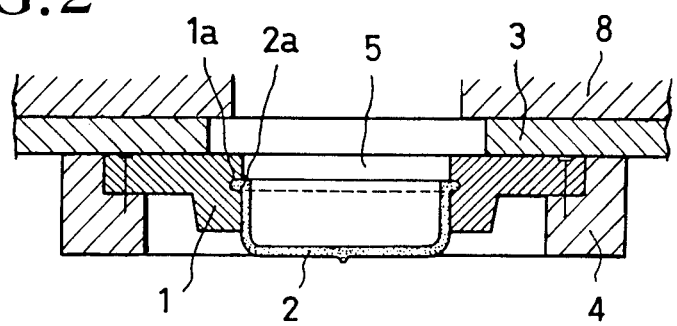
FIG. 2 is a longitudinal sectional view of a holding mold when a preform is moved.
Figure 3:
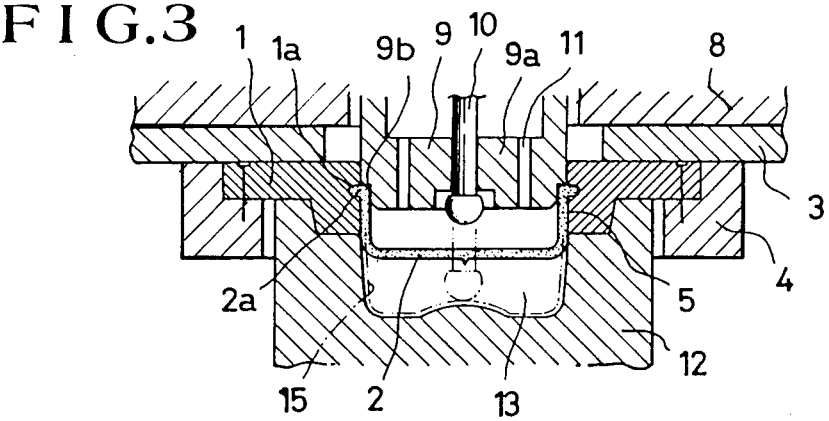
FIG. 3 is a longitudinal sectional view of a container molding mold device when a preform is set to a blow molding mold.

Referring generally to FIGS. 1-3, a reference numeral 1 designates a holding mold which also serves as a molding mold for a preform 2, and the holding mold is mounted on the lower surface of a horizontally rotating transfer plate 3. This holding mold 1 comprises a pair of split molds which are splittable in a horizontal direction and is mounted on the transfer plate 3 through a member 4 positioned at the lower surface of the transfer plate provided to be radially opened and closed.

The holding mold 1 internally forms a cavity 5 which has the same plane or cross-sectional shape as that of products such as a cup-like or box-like container, and in a peripheral wall of the cavity 5 is provided a lateral groove 1a of required depth which molds an outer edge 2a of the preform 2.

A reference numeral 6 designates an upper mold and 7 designates a lower mold, which are disposed at the injection molding position. The upper mold 6 is constructed such that it is forced into the cavity of the holding mold 1 from a hole portion bored in the transfer plate 3 and a base plate 8 thereabove to form a clearance for molding a side wall of a flat preform 2 relative to the peripheral wall of the cavity, and the lower mold 7 is constructed so as to form a clearance for molding a bottom wall of the preform 2 between an opening fitted into the lower surface of the holding mold 1 and the lower surface of the upper mold 6, when the lower mold is placed in contact with the lower side of the holding mold 1.

A reference numeral 9 designates a core member disposed at a container molding position, and has, similar to the upper mold 6 at the aforesaid injection molding position, an end 9a extending through a hole portion bored in the transfer plate 3 and the base plate 8 to airtightly fit into the peripheral wall of the cavity and is formed with a shoulder 9b in the circumference of the end, the peripheral side forwardly of the shoulder 9b being placed in pressure contact with the inner side of the preform 2 to hold the peripheral edge of the opening of the preform 2 together with the holding mold 1. A stretching rod 10 extends movably up and down through a central portion of the end 9a and the end 9a has blow holes 11 bored in both sides thereof.

A reference numeral 12 designates a blow mold for molding a container, and an upper surface to which opens a cavity 13 for molding a cup is formed in a fitting portion with respect to the holding mold 1.

Next, a molding method will be described by way of embodiments shown in FIGS. 1 to 3.

FIG. 1

First, in the injection molding position, the upper mold 6 and the lower mold 7 are closed with the holding mold 1 put therebetween to form a cavity for forming the flat preform 2 within the holding mold. Next, molten resin is injected into the cavity from an injection nozzle 16 placed in nozzle touching with a gate of the lower mold 7 to mold the preform 2 in which an outer edge 2a is molded by the lateral groove 1a.

After the preform has been molded, the upper mold 6 and the lower mold 7 are opened for release while the preform retains moldable heat.

FIG. 2

The preform 2 after release remains in the state wherein the peripheral edge is supported within the cavity of the holding mold 1 by the outer edge 2a molded by the lateral groove 1a. Thus, the holding mold 1 is transferred along with the preform 2 by rotation of the transfer plate 3 before the preform 2 cools.

FIG. 3

Figure 4:
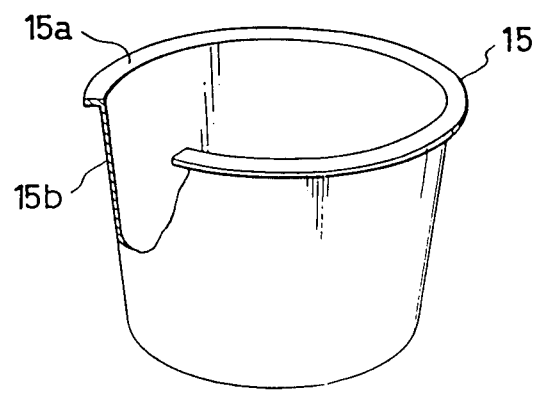
FIG. 4 is a partially longitudinal perspective view of a cup subjected to stretching blow molding from a preform.

When the holding mold 1 stops at the container molding position, the core member 9 and the blow mold 12 are closed with the holding mold 1 put therebetween. With this closure, the end 9a of the core member 9 is fitted into the upper portion of the cavity 5, and the peripheral surface forwardly of the shoulder 9b comes into contact with the inside of the preform 2 to hold the opening by the holding mold 1. In this state, when the stretching rod 10 is axially extended and air is blown into the preform 2 from the blow hole 11, the preform 2 fully expands, as shown by the broken line, to the surface of the cavity 13 of the blow mold 12 and a held portion, namely, a portion 15b other than the peripheral edge 15a is formed into a thin-wall cup 15 (see FIG. 4).

After the cup 15 has been molded, the core member 9 and the blow mold 12 are opened. Even in this opening, the aforesaid outer edge 2a is not slipped out of the holding mold 1, and then therefore, the holding mold 1 is transferred to the removing position together with the cup 15, after which the cup 15 is removed.

This removal can be accomplished very easily by opening the holding mold 1 in a horizontal direction to pull out the outer edge 2a from the lateral groove 1a, and after removal the holding mold 1 is again closed and transferred to the injection molding position.

Figure 5:
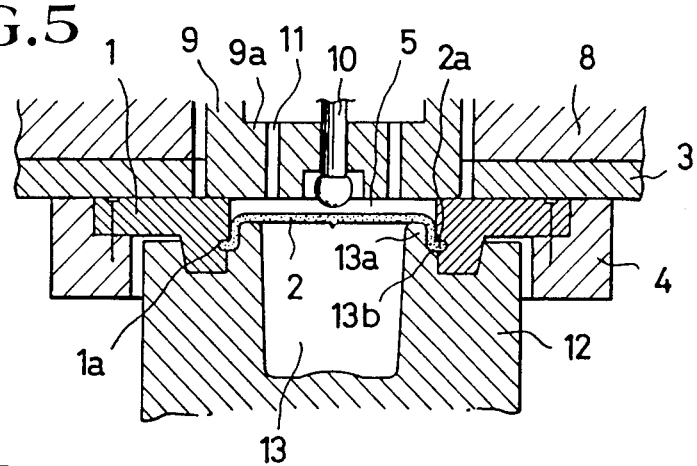
FIG. 5 is a longitudinal sectional view of a container molding mold device when a downwardly directed injection molded preform is set to a blow mold.
Figure 6:
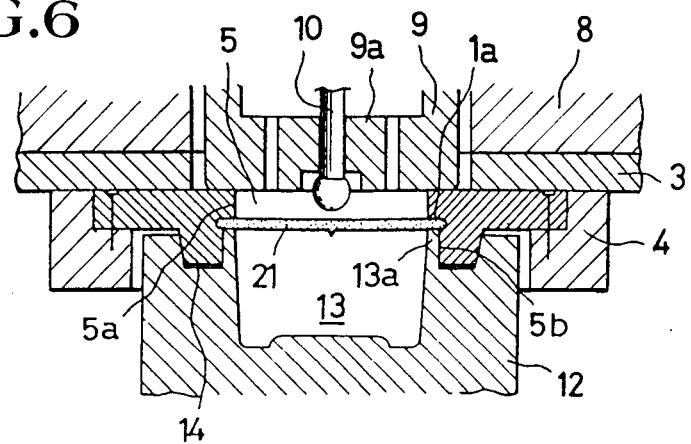
FIG. 6 is a longitudinal sectional view of a container molding mold device when a preform injection molded into a plate-like form is set to a blow mold.

FIGS. 5 and 6 illustrate a container molding mold device in which the preform 2 is held by the blow mold 12. In FIG. 5, a closing recess 14 is provided externally of an open edge 13a of a cavity 13 so that the open edge 13a comes into contact with the peripheral edge of the cavity 5 of the holding mold 1, a shoulder 13b which is similar to the shoulder 9b of the end 9a of the core member is provided on the outside of the open edge, and the side wall above the shoulder 13b is pressed against the inside of the preform to hold the preform 2 by the holding mold 1.

FIG. 6 illustrates an embodiment in which a preform 21 injection molded into a plate-like configuration is held by the holding mold 1 and the blow mold 12. It is designed so that an upper side wall 5a of the cavity is formed greater in thickness than a lower wall 5b with a part of the lateral groove as a shoulder so that the open edge 13a of the cavity 13 may be forced into the lower side in the periperal edge of the preform 21, and the peripheral edge of the preform 21 may be held by the upper end of the open edge 13a received in the upper wall 5a simultaneously with the closure and the upper wall of the lateral groove 1a.

As in the above-directed embodiments, where the blow mold 12 is used to hold the preforms 2, 21, the core member 9 need not be inserted into the cavity 13 but as shown the end is airtightly brought into contact with the upper surface of the holding mold 1 for closure.

Where products are molded by vacuum molding, molds having an attracting hole are used. In this case, a blow hole made in the core member 9 is not necessary.

Figure 7:
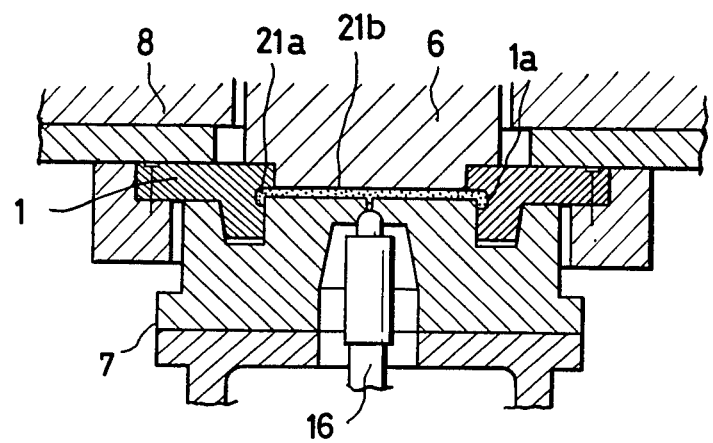
FIGS. 7 and 8 are resepectively longitudinal sectional views of an injection mold device successively showing the injection molding steps of a plate-like double layer preform.
Figure 8:
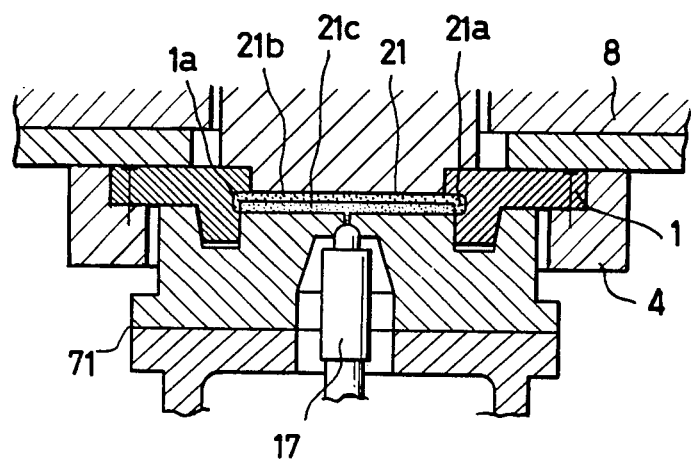

FIGS. 7 and 8 illustrate an embodiment in which a plate-like preform 21 having two layers is injection molded.

Even in the case of the double layer molding, the construction of the injection mold device used therefor is little different from the case where a single layer preform 2 shown in FIG. 1 is molded with the exception that a construction of a closing portion of a holding mold 1, an upper mold and a lower mold 6, 7 and a lower mold 71 and an injection nozzle 17 for carrying out the second injection molding are merely added.

In order to mold a plate-like and double layer preform 21, similarly to the holding mold 1 shown in FIG. 6, a holding mold 1 is formed with a downwardly directed shoulder in the inner peripheral side thereof, and a lateral groove 1a having a width equal to a thickness of a double layer portion is provided on the underside of the shoulder.

The upper mold 6 is forced into the upper edge of the lateral groove 1a to close the holding mold 1, and the lower mold 7 is forced into the half of the width of the lateal groove to close the holding mold 1 to form therebetween a cavity for molding the first layer preform associated with the lateral groove 1a.

When one resin is injected into the cavity from the injection nozzle placed in nozzle touching with the lower mold 7, a preform 21b having a thickness of a single layer portion in which a peripheral edge 21a is molded into a thickness of a double layer by the lateral groove 1a.

After the preform 21b has been injection molded, the upper and lower molds 6, 7 are opened to transfer the holding mold 1 along with the preform 21b to the next injection molding position by the transfer plate 3.

FIG. 8 illustrates an embodiment in which the second layer preform 21c is injection molded. When the holding mold 1 stops at the fixed position, prior to injection of the other resin, a second lower mold 71 is closed to the lower edge of the lateral groove 1a. Thereby, a cavity for molding the second preform is formed between a preform 21b having a thickness of a single layer with the peripheral edge thereof held by the holding mold 1 and the lower mold 71.

After such a closing operation, when resin different from that of the first one is injected into the cavity from the injection nozzle 17 placed in nozzle touching with the lower mold 71, a preform 21c having a thickness of a single layer portion is molded, and which preform 21c is formed into integration with the previously molded preform 21b to mold a double layer plate-like preform 21. After the injection molding, the preform 21 is transferred along with the holding mold 1 to the container molding position similarly to the case of the single layer whereby it is stretching blown or vacuum molded into a double layer cup by the procedure shown in FIG. 6.

Further, a double-layered flat preform such as shown in FIG. 1 can be also formed by same means as an embodiment illustrated in FIGS. 7 and 8.

What is claimed is:

1. A method for molding a thin-wall container using synthetic resin, the method comprising:
    providing a horizontally divisible holding mold including a pair of mold halves which define a cavity and are divisible in a horizontal direction, said mold halves each having a horizontal groove in an inner peripheral wall thereof and together forming an inner peripheral wall of said cavity, said grooves together forming a horizontal lateral groove for molding an outer edge of a preform in said peripheral wall of said cavity formed by the holding mold, the cavity having the same cross-sectional plane shape as that of a cup-like or box-like container or the like to be molded;
    interposing the holding mold between an upper mold and a lower mold;
    injection molding a plate-like or flat preform whose outer edge is fitted into the lateral groove of the holding mold;
    releasing the preform from the upper mold and the lower mold while retaining moldable heat to transfer it together with the holding mold to a container molding position;
    immediately closing a core member above the holding mold and a container molding mold below the holding mold, and providing the container molding mold with a shoulder facing the core member and a side wall projecting upwardly of the shoulder and within said peripheral wall of the cavity;
    holding the circumference of the preform between (1) the peripheral wall of the cavity of the holding mold, (2) the shoulder of the container molding mold, and (3) the sidewall upward of the shoulder of the container molding mold, so as to press the side of the preform toward the wall of the cavity and thereby form an airtight fit between the preform and the holding mold; and
    molding a container which is wide in opening and has a thin wall by blowing or vacuum molding of the preform including axially stretching the preform by mechanical means.

* * * * *